United States Patent [19]

van Zeggelaar

[11] 4,245,932

[45] Jan. 20, 1981

[54] SUCTION DREDGER AND METHOD OF LOADING THE SAME

[75] Inventor: Gerrit H. van Zeggelaar, Utrecht, Netherlands

[73] Assignees: Ingenieursbureau voor Systemen en Octrooien "Spanstaal" B. V.; Ballast-Nedam Groep N.V.; Amsterdamse Ballast Bagger en Grond (Amsterdam Ballast Dredging) B. V.; Scheepswerf en Machinefabriek "De Liesbosch" B.V., all of Nieuwegein & Amstelveen, Netherlands

[21] Appl. No.: 923,566

[22] Filed: Jul. 11, 1978

[30] Foreign Application Priority Data

Jul. 12, 1977 [NL] Netherlands .......................... 7707770

[51] Int. Cl.³ ............................................. B65G 53/66

[52] U.S. Cl. ........................................ 406/33; 406/38; 406/197

[58] Field of Search ....................... 406/38, 39, 23, 33, 406/168, 198, 197; 414/142; 37/58

[56] References Cited

U.S. PATENT DOCUMENTS

| 3,630,400 | 12/1971 | De Koning | 406/38 |
| 3,631,997 | 1/1972 | De Koning | 406/38 X |
| 3,698,573 | 10/1972 | Wolters et al. | 406/33 |

Primary Examiner—James L. Rowland
Attorney, Agent, or Firm—John P. Snyder

[57] ABSTRACT

In a method of loading a suction dredger in which a suspension of sand and water is pumped into the hold an effluent device is intermittently passed to lower and lower levels in dependence upon the weight of the load in the hold to an extent such that the suction dredger remains loaded substantially up to its maximum permissible carrying capacity.

3 Claims, 3 Drawing Figures

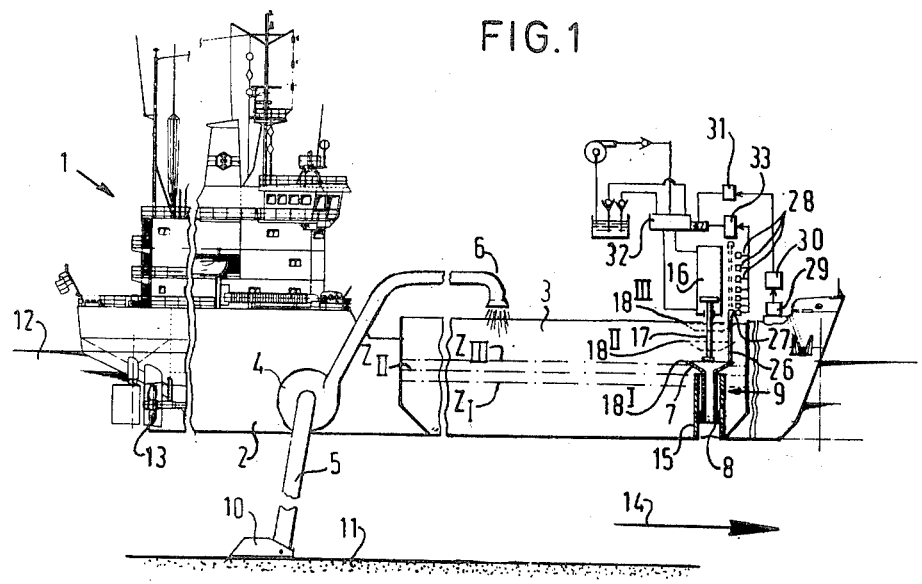
FIG. 1
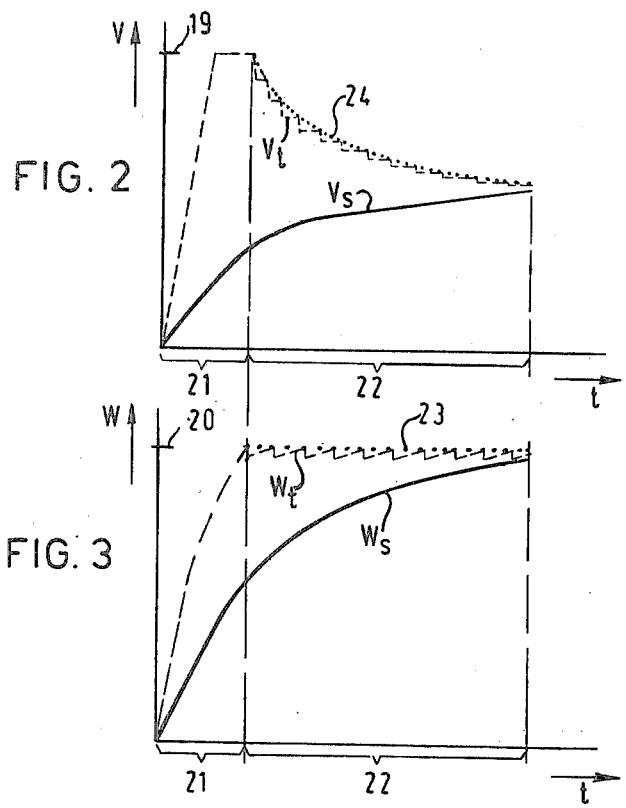
FIG. 2
FIG. 3

SUCTION DREDGER AND METHOD OF LOADING THE SAME

The invention relates to a method of loading a suction dredger in which a suspension of sand and water is pumped into the hold of the suction dredger during a loading operation which is carried out in at least two steps, to wit a first step in which the effluent means are kept at such a high level that the hold is loaded essentially up to its maximum volume and the suction dredger is loaded substantially up to its maximum permissible carrying capacity by pumping a suspension of sand and water into the hold and a subsequent second step in which additional suspension is pumped into the hold and in which the effluent means are lowered in dependence upon the weight of the load in the hold to an extent such that the suction dredger remains loaded substantially up to its maximum permissible carrying capacity.

Such a method is known from Dutch Pat. No. 138,182, to which U.S. Pat. No. 3,630,400 corresponds. Since the quantity of sand in the hold constantly increases, the effluents are constantly lowered in order to keep the suction dredger at its maximum permissible carrying capacity. Slow adjustment of the effluent means is performed only with difficulty.

The invention provides a more reliable method in which the hold can yet be loaded rapidly. According to the invention the effluent means are intermittently passed to lower and lower levels.

Incremental lowering of the effluent means can be easily performed in a reliable manner. Although in the method according to the invention the suction dredger is transiently loaded slightly below its maximum permissible carrying capacity, it appears that the suction dredger is loaded largely as rapidly as in the case in which it is endeavored to hold the suction dredger constantly exactly at its maximum permissible carrying capacity. This may be attributable to the fact that in accordance with the invention there are loading periods in which the flow of effluent is comparatively slight, so that the sand of the suspension contained in the hold has more time to settle down or to the fact that owing to the higher reliability of this method, the margin between the value at which the maximum permissible carrying capacity is set and the degree of loading at which the ship may founder can be smaller.

The invention relates to and provides, in addition, a suction dredger for carrying out the method in accordance with the invention, said dredger comprising a hold, a pump for pumping a suspension of sand and water into the hold and effluent means to be set in a first loading step at a high level corresponding to the maximum volume of the hold and in a second loading step at a lower level, the proportions of the hold volume being such that in a first step the suction dredger can be loaded with the sand and water mixture substantially up to its maximum permissible carrying capacity, there being provided control-means for incremental lowering of the effluent means in dependence upon loading measuring means during the second loading step, said dredger being characterized by control-means intermittently lowering in incremental steps the effluent means.

It is noted that Dutch patent application laid up for public inspection No. 7513264 discloses a suction dredger and a method of loading a hold of a suction dredger in which at least after the suspension level in the hold has reached the level of the outboard water the effluent means are held under the influence of a suction pump for lowering the suspension level to below the level of the outboard water.

The invention will be described more fully hereinafter by way of example with reference to the accompanying drawing.

In the drawing:

FIG. 1 is a schematic longitudinal sectional view of a preferred embodiment of a suction dredger in accordance with the invention in carrying out the method according to the invention, and FIGS. 2 and 3 are, respectively, a graph representing the volume of the hold and the weight of the load, when the method according to the invention is carried into effect.

The suction dredger 1 shown in FIG. 1 is a trawl dredger especially equipped for carrying out the method in accordance with the invention.

The suction dredger 1 comprises a hold 3 in a hull 2, a pump 4 for pumping a suspension of sand and water into the hold 3 and effluent means 9. The pump 4 communicates at one end with a suction pipe 5, a trailing suction head 10 of which is dragged along the ground 11 below the water 12, when the suction dredger 1 is propelled in the direction of the arrow 14 by means of a propeller 13. At the other end the pump 4 communicates with a loading pipe 6, from which the water and sand suspension gets into the hold 3.

The effluent means 9 comprise a vertical, fixed tube 15 communicating with the water 12, a tube 8 vertically displaceable in the former and having at the top end an overflow dish 7 and a hydraulic cylinder 16, the piston rod 17 of which is connected with the dish 7 for the vertical adjustment of the overflow rim 18 of the overflow dish 7.

The hold 3 has very large proportions as compared with the carrying capacity of the suction dredger 1, that it to say, the hold 3 can be filled with sand only up to the level $Z_{III}$.

In the method according to the invention the loading operation is performed in at least two steps 21 and 22 (see FIGS. 2 and 3). In the first step 21 the overflow rim 18 is held in its highest position $18^{III}$ indicated in FIG. 1 by broken lines, at least at such a high level that the hold 3 is loaded essentially up to its maximum volume 19 and up to the maximum carrying capacity 20 of the suction dredger 1 with a suspension of sand and water pumped into the hold 3. In FIGS. 2 and 3 the graphs drawn in broken lines represent the volume $V_t$ and the weight $W_t$, respectively, of the total quantities of sand and water contained in the hold 3, whereas the solid lines $V_s$ and $W_s$ represent the volume and the weight, respectively, of sand settled down in the hold 3. On the abscissa is plotted in FIGS. 2 and 3 the time. From FIGS. 2 and 3 it will be apparent that during the first step 21 there is first a period in which the hold 3 is filled with a suspension of sand and water, after which, when the hold 3 is already filled, further suspension of sand and water is pumped into the hold 3 whilst the effluent means 9 are still kept at the highest level so that the total volume $V_t$ remains at its maximum. Subsequently the next, second step 22 is carried out, in which additional suspension is pumped into the hold 3 and in which the effluent means are lowered in dependence upon the weight of the load in the hold 3 to an extent such that the suction dredger 1 remains essentially loaded up to its maximum permissible carrying capacity 20. From FIG. 3 it will be seen that in the course of time t during the second loading step 22 the graph $W_t$ indicated by broken lines extends substantially horizontally along the dotted line 23. This dotted, straight line 23 and the naturally varying dotted line 24 of FIG. 2 would be attained, if the overflow rim 18 were gradually lowered. According to the invention, however, the overflow rim 18 is lowered intermittently rather than gradually. For this purpose the effluent means 9 comprise a control-rod 26 with a head 27, which moves along pulse generators 28 during the upward and downward movements of the overflow rim 18. The pulse generators 28 correspond each to a level of the overflow rim 18, where it is retained for some time.

From FIG. 1 it will be apparent that the level difference of the upper pulse generators 28 may be larger than that of the subsequently lower pulse generator 28.

In order to maintain the suction dredger 1 essentially loaded up to its maximum permissible carrying capacity 20, it is equipped with a draught gauge 29, from which a signal is applied to a comparator 30, in which a value of the maximum permissible carrying capacity is set. When the maximum carrying capacity 20 of the suction dredger 1 is attained, the comparator 30 applies a pulse to a control-means 31 of a hydraulic slide 32, which controls the supply of fluid to the hydraulic cylinder 16. The overflow dish 7 then moves down by one level difference until the head 27 of the rod 26 reaches a pulse generator 28, which applies a pulse to a control-member 33 for setting the control-slide 32 in a stop position in order to prevent the overflow dish 7 from moving further downwards. During this downward movement of the overflow dish 7 the supernatant layer of water is at once removed from the hold 3, since it flows across the overflow rim 18 and through the tubes 8 and 15 into the outboard water 12. Then additional suspension is constantly pumped into the hold 3 and after some time the permissible carrying capacity of the suction dredger 1 is again attained or in other words, the broken lines meet the dotted lines of FIGS. 2 and 3. At this instant the comparator 30 again applies a signal to the control-member 31 and the hydraulic cylinder 16 is reactuated for lowering the overflow dish 7 by a further step. Thus loading is continued in the second loading step until the hold 3 is substantially filled with sand up to the maximum permissible carrying capacity. During the second loading step 22 the sand level rises from the level $Z_I$ via the level $Z_{II}$ to the level $Z_{III}$, to which correspond the positions $18^{III}$, $18^{II}$ and $18^I$ respectively.

What I claim is:

1. The method of loading a dredger vessel having a hold whose volume greatly exceeds that maximum volume of settled sand which constitutes a maximum permissible weight carrying capacity of said vessel, said method comprising the steps of:
    (a) continuously pumping a suspension of sand in water into said hold to attain a maximum height within the hold and draining off liquid at such maximum height to allow weight build-up due to accumulation of settled sand;
    (b) determining when the hold has been filled to said maximum permissible weight carrying capacity of the vessel and, in response thereto, draining off liquid from the hold at a first reduced height, which is in spaced relation below said maximum height, such that the volume of material within said hold is rapidly reduced to a new value which, initially, corresponds to less than said maximum permissible weight carrying capacity of the vessel;
    (c) continuing the pumping of step (a) while the draining off of step (b) remains at said first reduced height so that sand settles from the suspension in the hold under relatively quiescent conditions;
    (d) determining when the maximum permissible weight carrying capacity of the vessel is again reached and, in response thereto, draining off liquid as in step (b) at a second reduced height to attain a second new value of volume of material in the hold; and then
    (e) repeating steps (c) and (d) sequentially and repeatedly as necessary until the volume of settled sand has attained that value substantially corresponding to said maximum weight carrying capacity of the vessel.

2. A suction dredger comprising, in combination:
    a vessel having a hold whose volume greatly exceeds that volume of settled sand which corresponds to a maximum weight carrying capacity of the vessel;
    pump means for continuously pumping a suspension of sand in water into said hold;
    drain means in said hold for draining liquid from the hold at a rate substantially exceeding that rate at which said pump means introduces suspension into the hold, said drain means having an inlet mouth initially positioned at a maximum height within said hold;
    detector means for detecting when said maximum weight carrying capacity has been attained; and
    actuator means responsive to said detector means for lowering said inlet mouth step-wise to a new position each time said maximum permissible weight carrying capacity has been attained, each new position being spaced below the preceeding position by an amount sufficient to reduce the volume of material in the hold rapidly to a value which, initially, corresponds to less than said maximum weight carrying capacity.

* * * * *